United States Patent
Hamdan et al.

(10) Patent No.: US 7,301,384 B2
(45) Date of Patent: Nov. 27, 2007

(54) MULTIMODE, UNIFORM-LATENCY CLOCK GENERATION CIRCUIT

(75) Inventors: Fadi Adel Hamdan, Raleigh, NC (US); Jeffrey Herbert Fischer, Cary, NC (US); William James Goodall, III, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 11/394,557

(22) Filed: Mar. 31, 2006

(65) Prior Publication Data

US 2007/0229134 A1 Oct. 4, 2007

(51) Int. Cl.
*G06F 1/04* (2006.01)
(52) U.S. Cl. .................. 327/291; 327/299
(58) Field of Classification Search .............. None
See application file for complete search history.

(56) References Cited

U.S. PATENT DOCUMENTS 5,386,392 A * 1/1995 Cantiant et al. ........... 365/233
6,850,460 B1 * 2/2005 Chan et al. ................ 365/233
7,042,672 B2 * 5/2006 Brenden et al. ............ 360/75
7,102,408 B2 * 9/2006 Yamaguchi ................ 327/293

* cited by examiner

*Primary Examiner*—Cassandra Cox
(74) *Attorney, Agent, or Firm*—Thomas Rouse; Nicholas J. Pauley; John L. Ciccozzi (57) ABSTRACT

A multimode, uniform-latency clock generation circuit (CGC) is described herein. In one example, the multimode, uniform-latency CGC generates a pulse clock signal via a clock generation path responsive to a clock chopping signal being active and generates a phase clock signal via the same clock generation path responsive to the clock chopping signal being inactive. The clock chopping signal is activated responsive to a mode control input signal being in a first state and deactivated responsive to either the mode control input signal being in a second state or a plurality of clock enable signals being inactive. In one or more embodiments, a multimode, uniform-latency CGC is included in a microprocessor for providing pulse clock signals to inter-stage pulsed sequential storage elements when operating in a timing sensitive mode and for providing phase clock signals to the inter-stage pulsed sequential storage elements when operating in a timing insensitive mode.

20 Claims, 5 Drawing Sheets

MULTIMODE, UNIFORM-LATENCY CLOCK GENERATION CIRCUIT

FIELD

The present disclosure generally relates to clock gating, and particularly relates to generating multimode clock signals having uniform latency.

BACKGROUND

High-performance integrated circuits, particularly microprocessors, commonly provide various modes of operation. Microprocessors typically operate in one of various operating modes such as high performance, low power, standby, or test modes. Microprocessors operate in a high-performance mode when tasked with timing-critical applications. Some microprocessors use pulsed sequential storage elements, e.g., pulsed latches or flip-flops, to improve performance when executing instructions relating to timing-critical applications. For example, pulsed sequential storage elements are dispersed throughout instruction execution pipelines for improving data transfer speed between pipeline stages. Pulsed sequential storage elements capture and/or launch data in response to a pulse clock signal, i.e., a clock signal having a pulse width less than half of the clock period.

However, when configured in an operating mode that is timing insensitive, e.g., low power, standby or test modes. Particularly, the pulsed sequential storage elements contained in a microprocessor may not function properly. For example, during scan testing, pulsed sequential storage elements are commonly arranged in one or more "scan chains" to facilitate loading of test data into a microprocessor and unloading of test results from the microprocessor. When configured as scan chains, pulsed sequential storage elements commonly do not function properly when triggered by narrow clock pulses. As such, a phase clock signal, i.e., a clock signal having a pulse width approximately half of the clock period, is used to clock pulsed sequential storage elements to ensure proper functionality.

Conventional microprocessors commonly include separate clock generators for providing both pulse and phase clock signals to pulsed sequential storage elements. That is, one clock generator provides a pulse clock signal for clocking the pulsed storage elements during timing critical operating modes and a separate clock generator provides a phase clock signal for clocking the pulsed storage elements during timing insensitive operating modes. The clock signal outputs of the separate clock generators are presented to a multiplexer circuit for selection based on the particular operating mode of the microprocessor. In such applications, dual clock signal generators consume additional area and power. Further, a clock signal produced by one of the clock generators is subjected to additional capacitance associated with the inactive clock generator.

Clock skew further complicates the use of separate clock generators for providing both pulse and phase clock signals to pulsed sequential storage elements. Clock skew is a spatial variation of a clock signal as it is distributed through a system such as a microprocessor. Clock skew is commonly caused by various resistive/capacitive (RC) characteristics of the clock paths and different loading of the clock signal at different points in the microprocessor. Clock skew is reduced when the dual clock generators have similar clock input-to-output latency. In other words, clock generators that produce clock signals having approximately the same delay minimize clock skew. However, producing separate clock generators having similar clock input-to-output latency is difficult given various considerations such as fabrication and circuit layout variations.

SUMMARY OF THE DISCLOSURE

According to the methods and apparatus taught herein, a multimode, uniform-latency clock generation circuit is presented. The multimode, uniform-latency clock generation circuit is configured to generate multimode clock signals having uniform latency by generating a pulse clock signal via a clock generation path responsive to a clock chopping signal being active and generating a phase clock signal via the same clock generation path responsive to the clock chopping signal being inactive. The clock chopping signal is activated responsive to a mode control input signal being in a first state and deactivated responsive to either the mode control input signal being in a second state or a plurality of clock enable signals being inactive.

Thus, in at least one embodiment, a multimode, uniform-latency clock generation circuit comprises a clock generation stage, a clock chopping stage and a mode control circuit. The clock generation stage has a single clock generation path and is configured to generate a pulse clock signal responsive to a clock chopping signal being active and a phase clock signal responsive to the clock chopping signal being inactive. The clock chopping stage is configured to activate the clock chopping signal when enabled in a pulse mode and deactivate the clock chopping signal when enabled in a phase mode. The mode control circuit is configured to enable the clock chopping stage in pulse mode responsive to a mode control input signal being in a first state, enable the clock chopping stage in phase mode responsive to the mode control input signal being in a second state, and disable the clock chopping stage responsive to a plurality of clock enable signals being inactive.

Corresponding to the above multimode, uniform-latency clock generation methods and apparatuses, a exemplary microprocessor comprises a multimode, uniform-latency clock generation circuit and one or more pipelines, each pipeline having a plurality of stages separated by inter-stage pulsed sequential storage elements. The multimode, uniform-latency clock generation circuit comprises a clock generation stage, a clock chopping stage and a mode control circuit. The clock generation stage has a single clock generation path and is configured to provide a pulse clock signal to the inter-stage pulsed sequential storage elements responsive to a clock chopping signal being active and provide a phase clock signal to the inter-stage pulsed sequential storage elements responsive to the clock chopping signal being inactive. The clock chopping stage is configured to activate the clock chopping signal when enabled in a pulse mode and deactivate the clock chopping signal when enabled in a phase mode. The mode control circuit is configured to enable the clock chopping stage in pulse mode responsive to a mode control input signal being in a first state, enable the clock chopping stage in phase mode responsive to the mode control input signal being in a second state, and disable the clock chopping stage responsive to a plurality of clock enable signals being inactive.

Of course, the present disclosure is not limited to the above embodiments. Those skilled in the art will recognize additional possible embodiments upon reading the following detailed description, and upon viewing the accompanying drawings.

DETAILED DESCRIPTION

Figure 1:
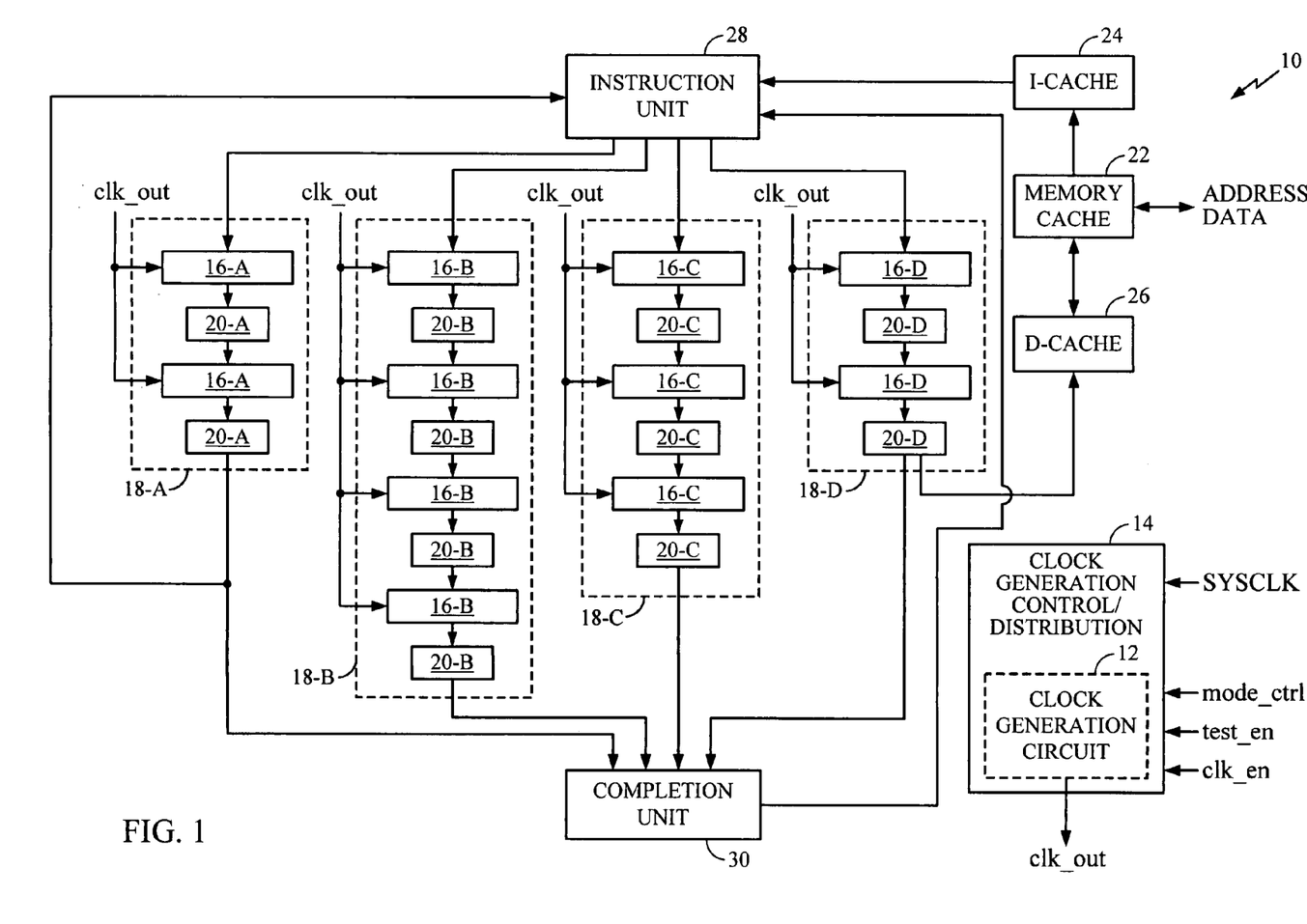
FIG. 1 is a block diagram of a microprocessor including a multimode, uniform-latency clock generation circuit.

FIG. 1 illustrates a microprocessor 10 including a multimode, uniform-latency Clock Generation Circuit (CGC) 12. The CGC 12 is included in or associated with clock generation, control and distribution circuitry 14 of the microprocessor 10. The clock generation, control and distribution circuitry 14 manages the internal timings of the microprocessor 10 in response to an external system clock signal (SYSCLK). In response to an external mode control input signal (mode_ctrl) received by the microprocessor 10, the CGC 12 is enabled in either a pulse clocking mode or a phase clocking mode. The mode control input signal is set to a first state for indicating pulse mode when the microprocessor 10 is configured for peak performance, e.g., a normal functional operating mode or a launch/capture stage of a scan test mode. Conversely, the mode control input signal is set to a second state for indicating phase mode when the microprocessor 10 is configured for stable performance, e.g., a load/unload stage of a scan test mode or a low power or standby operational mode.

During either clocking mode, the CGC 12 generates a clock signal output (clk_out) for clocking pulsed sequential storage elements 16-A-16-D of the microprocessor 10, i.e., pulsed latch or flip-flop circuits. The pulse width of the clock signal generated by the CGC 12 is determined by the operating mode of the CGC 12. When enabled in pulse mode, the CGC 12 generates a pulse clock signal, i.e., a clock signal having a pulse width less than half of the clock period. When enabled in phase mode, the CGC 12 generates a phase clock signal, i.e., a clock signal having a pulse width approximately half of the clock period.

The pulsed sequential storage elements 16-A-16-D receive the clock signal generated by the CGC 12. When the microprocessor 10 is operating in a timing sensitive mode, i.e., pulse mode, the pulse clock signal causes the pulsed sequential storage elements 16-A-16-D to function at an optimal speed. The pulsed sequential storage elements 16-A-16-D capture and/or launch data more rapidly when triggered by a clock signal having a short pulse width. Conversely, when the microprocessor 10 is operating in a timing insensitive mode, i.e., phase mode, the phase clock signal generated by the CGC 12 causes the pulsed sequential storage elements 16-A-16-D to capture and/or launch data more slowly, but with added insensitivity to timing variance.

The CGC 12 generates the pulse and phase clock signals via a single clock generation path (not shown). As such, the single clock generation path reduces clock skew by subjecting the generated clock signal to the same clock input-to-output latency regardless of the clock generation mode. That is, the clock signal generated by the CGC 12 incurs the same latency in both pulse and phase modes. Thus, clock skew induced by the CGC 12 is minimized.

In operation, the microprocessor 10 retrieves instructions and corresponding data from memory (not shown). The microprocessor 10 executes the instructions and stores results to the memory. In a non-limiting example, the microprocessor 10 includes a plurality of pipelines 18-A-18-D for executing instructions. Each pipeline includes a plurality of stages including combinatorial logic 20-A-20-D for executing an instruction or part of an instruction. The stages are separated by the inter-stage pulsed sequential storage elements 16-A-16-D. The inter-stage pulsed sequential storage elements 16-A-16-D capture data from a previous pipeline stage and/or launch the data to a succeeding stage in response to a trigger signal, e.g., the clock signal generated by the CGC 12.

In one embodiment, a memory cache 22, e.g., a level-2 cache, stores address and data information retrieved from external memory via bus interface logic (not shown) of the microprocessor 10. The memory cache 22 forwards instruction information to an instruction cache 24 and forwards data to and receives data from a data cache 26. An instruction unit 28 provides centralized control of instruction flow to the pipelines 18-A-18-D of the microprocessor 10. A completion unit 30 tracks processing of instructions from dispatch by the instruction unit 28 through execution by the pipelines 18-A-18-D. Each pipeline executes instructions received from the instruction unit 28 in stages. In a non-limiting example, a branch pipeline 18-A includes two stages of combinatorial logic 20-A for executing an instruction, a floating point pipeline 18-B includes four stages of combinatorial logic 20-B, an integer pipeline 18-C includes three stages of combinatorial logic 20-C, and a load/store pipeline 18-D includes two stages of combinatorial logic 20-D. Those skilled in the art will appreciate that the microprocessor 10 may be superpipelined and/or superscalar. As such, the microprocessor 10 may include various pipelines for executing instructions where each pipeline may include various stages separated by inter-stage pulsed sequential storage elements.

Figure 2:
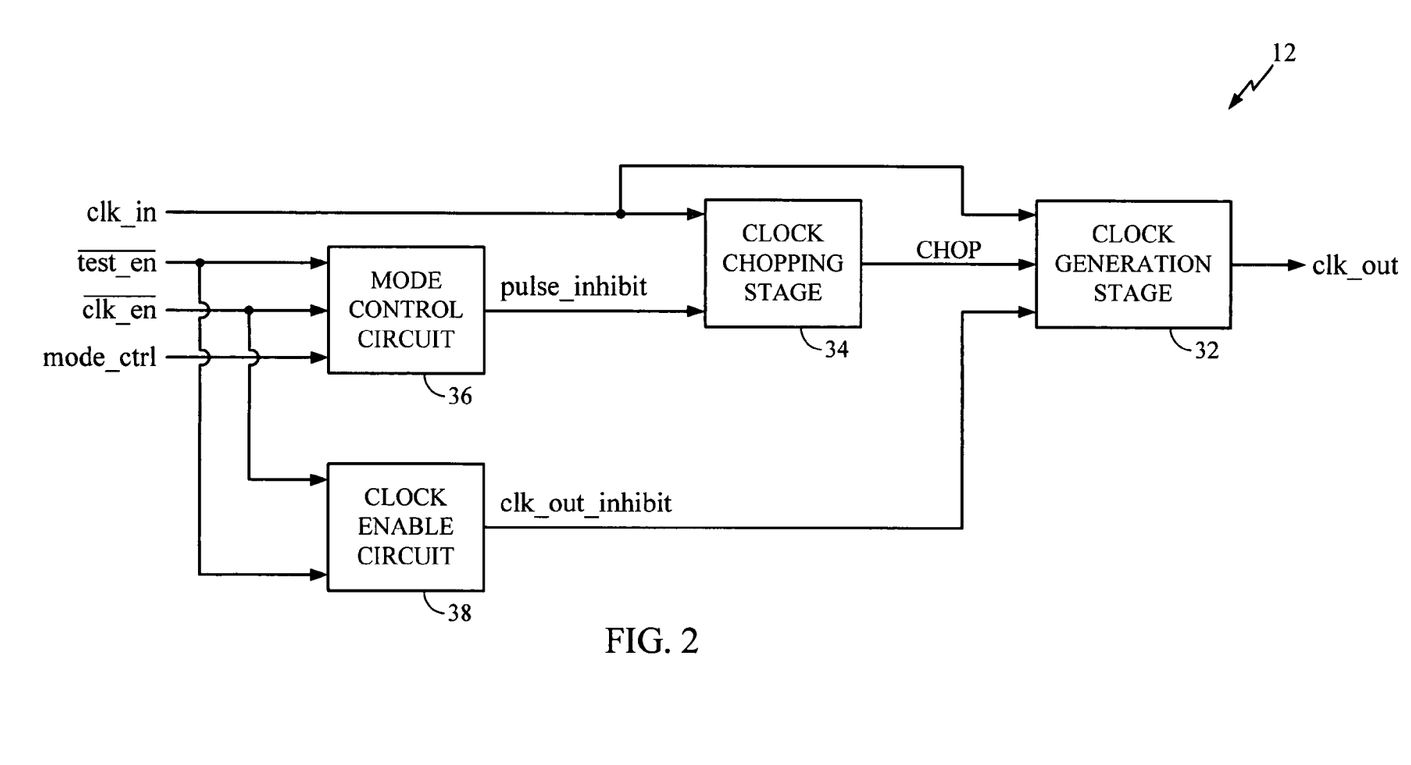
FIG. 2 is a block diagram of a multimode, uniform-latency clock generation circuit.

FIG. 2 illustrates an embodiment of the multimode, uniform-latency CGC 12. The CGC 12 includes a clock generation stage 32, a clock chopping stage 34, a mode control circuit 36 and a clock enable circuit 38. The mode control circuit 36 enables the CGC 12 in either pulse or phase mode in response to the mode control input signal (mode_ctrl). In operation, the clock chopping stage 34 provides a clock chopping signal (CHOP) to the clock generation stage 32. As illustrated by Step 100 of the program logic of FIG. 3, the clock generation stage 32 generates either a pulse or phase clock signal (clk_out) depending on the state of the clock chopping signal. When the clock chopping signal is active, the clock generation stage 32 generates a pulse clock signal. Conversely, when the clock chopping signal is inactive, the clock generation stage 32 generates a phase clock signal.

Figure 3:
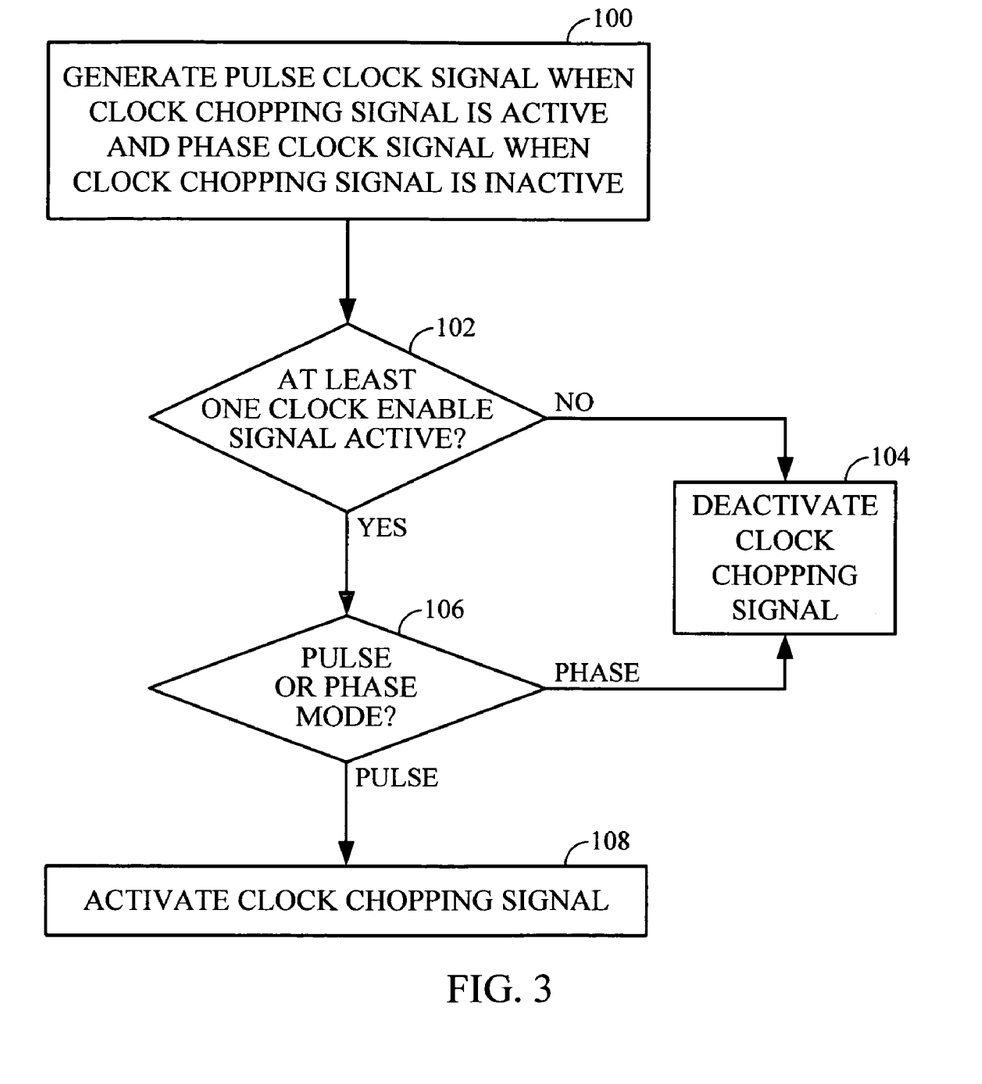
FIG. 3 is a logic flow diagram illustrating program logic for generating multimode clock signals having uniform latency.

As illustrated by Step 102 of the program logic of FIG. 3, a plurality of clock enable signals, e.g., test_en and clk_en, determine whether the clock chopping signal is active or inactive. When the CGC 12 is enabled in either pulse or phase mode, at least one of the clock enable signals is active. For example, test_en is active when the CGC 12 is enabled in phase mode and clk_en is active when the CGC 12 is enabled in pulse mode. Otherwise, all clock enable signals are inactive, thus indicating that the CGC 12 may be disabled to save power. As illustrated by Step 104 of the program logic of FIG. 3, the mode control circuit 36 causes the clock chopping stage 34 to deactivate the clock chopping signal when all clock enable signals are inactive. Particularly, the mode control circuit 36 activates a pulse clock inhibit signal (pulse_inhibit), thus indicating to the clock chopping stage 34 that the clock chopping signal is to be deactivated. As such, power consumption is reduced because the clock chopping stage 34 no longer switches when the clock enable signals are inactive. If the clock generation stage 32 is enabled, the deactivated clock chopping signal causes the clock generation stage 32 to generate a phase clock signal as will be discussed in detail below. Power consumption may be further reduced by the clock enable circuit 38 disabling the clock generation stage 32 in response to the clock enable signals being inactive. Particularly, the clock enable circuit 38 activates a clock output inhibit signal (clk_out_inhibit) when all clock enable signals are inactive, thus disabling the clock generation stage 32.

As illustrated by Step 106 of the program logic of FIG. 3, the mode control input signal controls in which mode the CGC 12 is enabled. That is, when the mode control input signal is in a first state indicating pulse mode, the mode control circuit 36 deactivates the pulse clock inhibit signal. In response, the clock chopping stage 34 activates the clock chopping signal as illustrated by Step 108 of the program logic of FIG. 3, thus causing the clock generation stage 32 to generate a pulse clock signal. When the mode control input signal is in a second state indicating phase mode, the mode control circuit 36 activates the pulse clock inhibit signal. In response, the clock chopping stage 34 deactivates the clock chopping signal as illustrated by Step 104 of the program logic of FIG. 3, thus causing the clock generation stage 32 to generate a phase clock signal.

Figure 4:
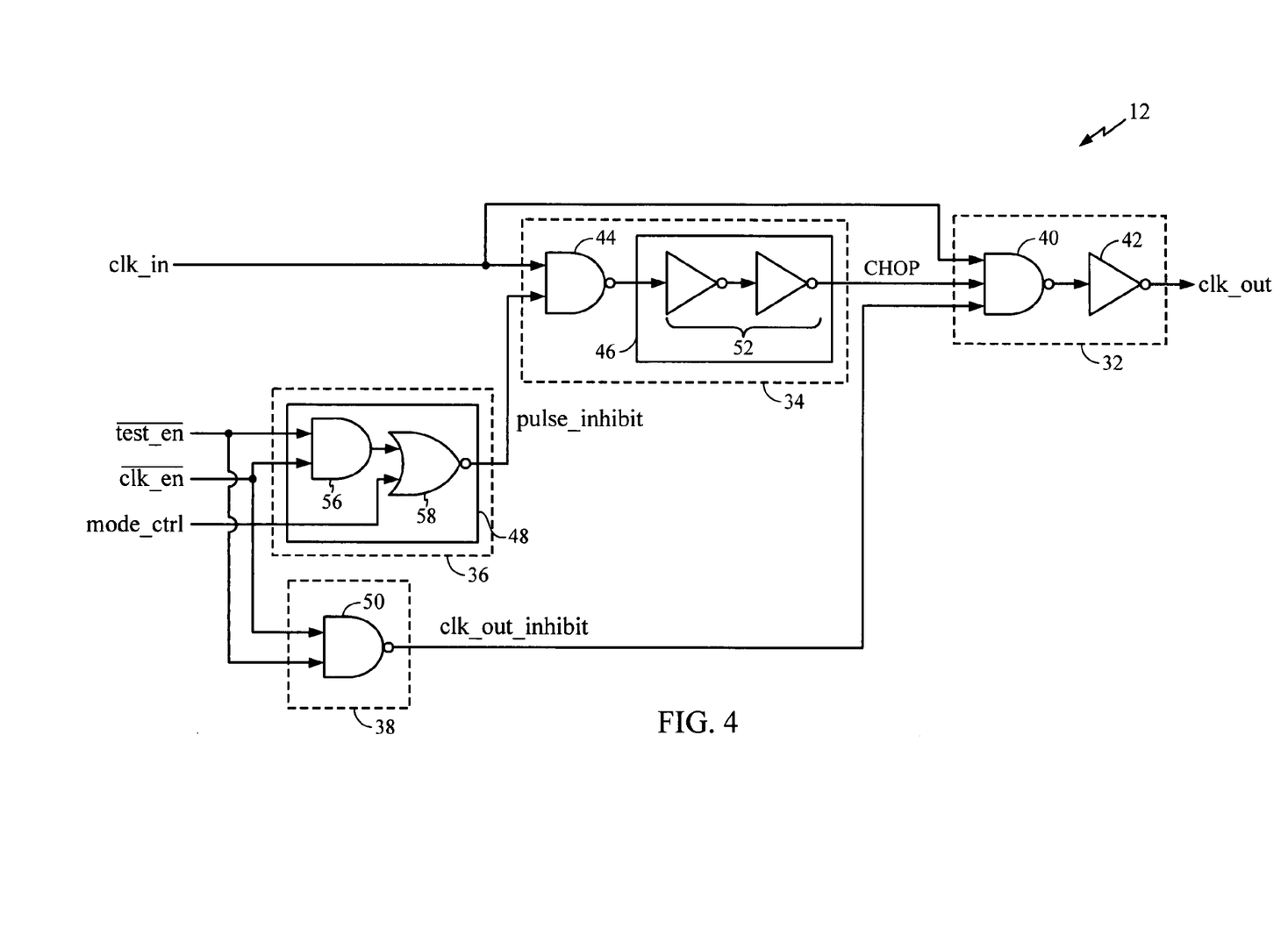
FIG. 4 is a circuit diagram of a multimode, uniform-latency clock generation circuit.

FIG. 4 illustrates an exemplary circuit implementation of the multimode, uniform-latency CGC 12. The exemplary circuit implementation is next described with reference to FIGS. 5A-5B, which illustrate timing relationships of various signals generated by the multimode, uniform-latency CGC 12 during pulse and phase modes, respectively. The clock generation stage 32 of the CGC 12 includes a single clock generation path comprising a clock gating circuit 40 and an inverter 42. The clock chopping stage 34 of the CGC 12 includes a clock chopping gating circuit 44 and a delay element 46. The mode control circuit 36 of the CGC 12 includes an and-or-invert (AOI) logic gate 48 and the clock enable circuit 38 of the CGC 12 includes a logic circuit 50.

Figure 5A:
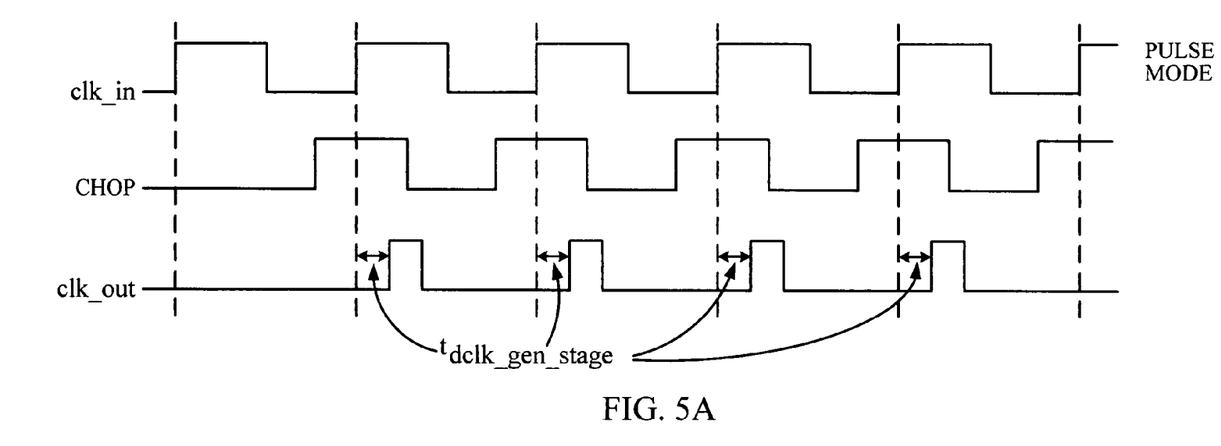
FIGS. 5A-5B are timing diagrams of various signals generated by the multimode, uniform-latency clock generation circuit of FIG. 4.

The single clock generation path of the clock generation stage 32 reduces clock skew by generating a clock signal having the same clock input-to-output latency regardless of the clock generation mode. When the CGC 12 is enabled in pulse mode, the clock gating circuit 40 generates a pulse clock signal by combining a phase clock input signal (clk_in) with the active clock chopping signal (CHOP). Because the active clock chopping signal is a delayed version of the phase clock input signal, the output of the clock generation stage 32 (clk_out) is a periodic pulse signal having a pulse width corresponding to the delay associated with the clock chopping stage 34. As such, clk_out is edge-aligned with the phase clock input signal with a slight offset due to the delay associated with the clock gating circuit 40 and the inverter 42 ($t_{dclk\_gen\_stage}$), as illustrated by FIG. 5A.

Figure 5B:
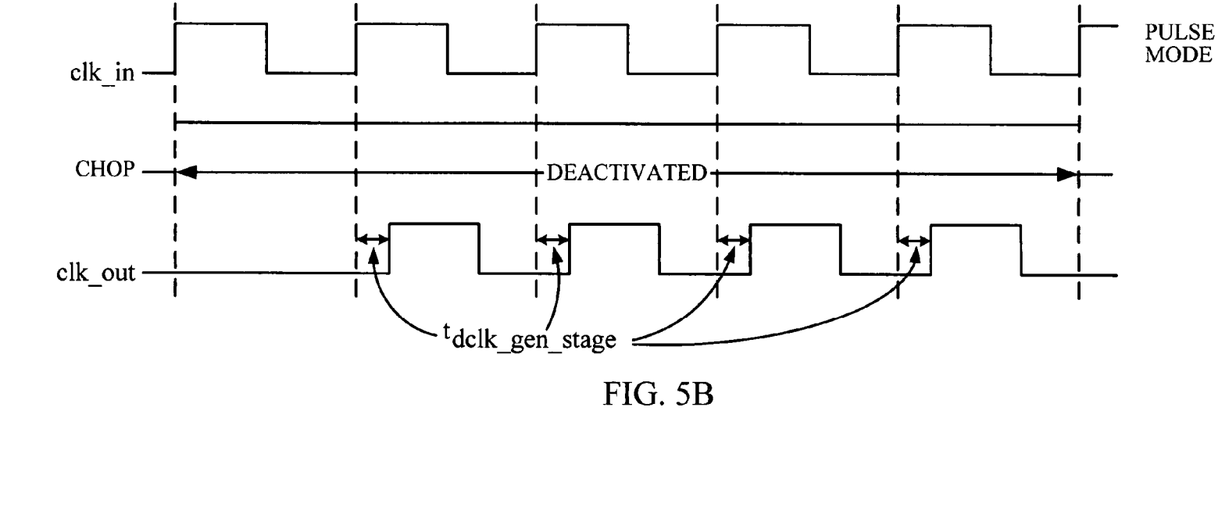

When the CGC 12 is enabled in phase mode, the clock generation stage 32 generates a phase clock signal by gating the phase clock input signal with the deactivated clock chopping signal. The deactivated clock chopping signal functions as a phase clock gating signal because it is fixed at a certain voltage level and does not oscillate. As such, the output of the clock generation stage 32 (clk_out) is a periodic phase signal having a pulse width corresponding to the pulse width of the phase clock input signal. Further, the periodic phase signal output is edge-aligned with the phase clock input signal with the same slight offset due to the delay associated with the clock gating circuit 40 and the inverter 42 ($t_{dclk\_gen\_stage}$), as illustrated by FIG. 5B. Because both pulse and phase clock signals generated by the CGC 12 are subjected to the same delay, that is, the delay associated with the clock gating circuit 40 and the inverter 42 ($t_{dclk\_gen\_stage}$), the clock skew associated with the CGC 12 is minimized.

The clock chopping stage 34 of the CGC activates the clock chopping signal by delaying the phase clock input signal. Particularly, the clock chopping gating circuit 44 passes the phase clock input signal (clk_in) to the delay element 46 when the clock chopping stage 34 is enabled in pulse mode by the mode control circuit 36. The delay element 46, comprising double inverters 52 in one example, delays the phase clock input signal and provides the delayed phase clock input signal as a clock chopping signal to the clock generation stage 32. The clock chopping stage 34 deactivates the clock chopping signal by preventing the phase clock input signal from passing to the delay element 46. Particularly, the clock chopping gating circuit 44 deactivates the clock chopping signal by outputting a fixed-level phase clock gating signal when the clock chopping stage 34 is enabled in phase mode by the mode control circuit 36.

The AOI logic gate 48 of the mode control circuit 36 comprises a first stage 56 and a second stage 58. The first stage 56 disables the clock chopping stage 34 when all clock enable signals, e.g., test_en and clk_en, are inactive by activating the pulse clock inhibit signal (pulse_inhibit). The active pulse clock inhibit signal indicates to the clock chopping stage 34 that the clock chopping signal is to be deactivated. As such, power consumption is reduced when the CGC 12 is inactive, i.e., all clock enable signals are inactive. To further reduce power consumption when the CGC 12 is inactive, the logic circuit 50 of the clock enable circuit 38 disables the clock generation stage 32 in response to all clock enable signals being inactive. Continuing with the AOI logic gate 48, the second stage 58 enables the clock chopping stage 34 in pulse mode when the mode control input signal is in a pulse-mode state by deactivating the pulse clock inhibit signal. Conversely, the second stage 58 enables the clock chopping stage 34 in phase mode when the mode control input signal is in a phase-mode state by activating the pulse clock inhibit signal.

The multimode, uniform-latency CGC 12 may be advantageously included in any integrated circuit having a use for more than one clock mode, e.g., the microprocessor 10 illustrated in FIG. 1. In one example, the mode control input signal is set to a first state for indicating pulse mode when an integrated circuit is configured in one of a normal functional operating mode or a launch/capture stage of a scan test mode. Alternatively, the mode control input signal is set to a second state for indicating phase mode when the integrated circuit is in one of a load/unload stage of a scan test mode or a low power or standby operational mode.

With the above range of variations and applications in mind, it should be understood that the present disclosure is not limited by the foregoing description, nor is it limited by the accompanying drawings. Instead, the present disclosure is limited only by the following claims and their legal equivalents.

What is claimed is:

1. A method of generating multimode clock signals having uniform latency, comprising:
   generating a pulse clock signal via a clock generation path responsive to a clock chopping signal being active;
   generating a phase clock signal via the same clock generation path responsive to the clock chopping signal being inactive;
   activating the clock chopping signal responsive to a mode control input signal being in a first state; and
   deactivating the clock chopping signal responsive to one of the mode control input signal being in a second state and a plurality of clock enable signals being inactive.

2. The method of claim 1, wherein activating the clock chopping signal comprises delaying a phase clock input signal responsive to the mode control input signal being in the first state.

3. The method of claim 2, wherein deactivating the clock chopping signal comprises inhibiting generation of the delayed phase clock input signal responsive to one of the mode control input signal being in the second state and the clock enable signals being inactive.

4. The method of claim 1, further comprising disabling generation of the pulse and phase clock signals responsive to the clock enable signals being inactive.

5. The method of claim 1, further comprising capturing data by a plurality of pulsed sequential storage elements responsive to one of the pulse and phase clock signals.

6. A multimode, uniform-latency clock generation circuit, comprising:
   a clock generation stage having a single clock generation path, the clock generation stage configured to generate a pulse clock signal responsive to a clock chopping signal being active and a phase clock signal responsive to the clock chopping signal being inactive;
   a clock chopping stage configured to activate the clock chopping signal when enabled in a pulse mode and deactivate the clock chopping signal when enabled in a phase mode; and
   a mode control circuit configured to enable the clock chopping stage in pulse mode responsive to a mode control input signal being in a first state, enable the clock chopping stage in phase mode responsive to the mode control input signal being in a second state, and disable the clock chopping stage responsive to a plurality of clock enable signals being inactive.

7. The multimode, uniform-latency clock generation circuit of claim 6, wherein the clock chopping stage is configured to activate the clock chopping signal when enabled in pulse mode by delaying a phase clock input signal and providing the delayed phase clock input signal to the clock generation stage and deactivate the clock chopping signal when enabled in phase mode by inhibiting generation of the delayed phase clock input signal and providing a phase clock gating signal to the clock generation stage.

8. The multimode, uniform-latency clock generation circuit of claim 7, wherein the clock chopping stage comprises:
   a gating circuit configured to pass the phase clock input signal when enabled in pulse mode and inhibit generation of the delayed phase clock input signal when enabled in phase mode; and
   a delay element configured to delay the phase clock input signal and provide the delayed phase clock input signal to the clock generation stage responsive to the gating circuit passing the phase clock input signal and provide the phase clock gating signal to the clock generation stage responsive to the gating circuit inhibiting generation of the delayed phase clock input signal.

9. The multimode, uniform-latency clock generation circuit of claim 6, wherein the mode control circuit comprises an and-or-invert (AOI) logic gate configured to enable the clock chopping stage in pulse mode responsive to the mode control input signal being in the first state, enable the clock chopping stage in phase mode responsive to the mode control input signal being in the second state, and disable the clock chopping stage responsive to the clock enable signals being inactive.

10. The multimode, uniform-latency clock generation circuit of claim 9, wherein the AOI logic gate comprises:
    a first stage configured to disable the clock chopping stage responsive to the clock enable signals being inactive; and
    a second stage configured to enable the clock chopping stage in pulse mode responsive to the mode control input signal being in the first state and enable the clock chopping stage in phase mode responsive to the mode control input signal being in the second state.

11. The multimode, uniform-latency clock generation circuit of claim 6, further comprising a clock enable circuit configured to disable the clock generation stage responsive to the clock enable signals being inactive.

12. An integrated circuit comprising the multimode, uniform-latency clock generation circuit of claim 6.

13. The multimode, uniform-latency clock generation circuit of claim 12, wherein the mode control input signal is in the first state responsive to the integrated circuit being in one of a normal functional operating mode and a launch/capture stage of a scan test mode and the mode control input signal is in the second state responsive to the integrated circuit being in one of a load/unload stage of the scan test mode, a low power mode, and a standby mode.

14. A microprocessor, comprising:
    one or more pipelines, each pipeline having a plurality of stages separated by inter-stage pulsed sequential storage elements; and
    a multimode, uniform-latency clock generation circuit, comprising:
      a clock generation stage having a single clock generation path, the clock generation stage configured to provide a pulse clock signal to the inter-stage pulsed sequential storage elements responsive to a clock chopping signal being active and provide a phase clock signal to the inter-stage pulsed sequential storage elements responsive to the clock chopping signal being inactive;
      a clock chopping stage configured to activate the clock chopping signal when enabled in a pulse mode and deactivate the clock chopping signal when enabled in a phase mode; and
      a mode control circuit configured to enable the clock chopping stage in pulse mode responsive to a mode control input signal being in a first state, enable the clock chopping stage in phase mode responsive to the mode control input signal being in a second state, and disable the clock chopping stage responsive to a plurality of clock enable signals being inactive.

15. The microprocessor of claim 14, wherein the clock chopping stage is configured to activate the clock chopping signal when enabled in pulse mode by delaying a phase clock input signal and providing the delayed phase clock input signal to the clock generation stage and deactivate the clock chopping signal when enabled in phase mode by inhibiting generation of the delayed phase clock input signal and providing a phase clock gating signal to the clock generation stage.

16. The microprocessor of claim 15, wherein the clock chopping stage comprises:
  a gating circuit configured to pass the phase clock input signal when enabled in pulse mode and inhibit generation of the delayed phase clock input signal when enabled in phase mode; and
  a delay element configured to delay the phase clock input signal and provide the delayed phase clock input signal to the clock generation stage responsive to the gating circuit passing the phase clock input signal and provide the phase clock gating signal to the clock generation stage responsive to the gating circuit inhibiting generation of the delayed phase clock input signal.

17. The microprocessor of claim 14, wherein the mode control circuit comprises an and-or-invert (AOI) logic gate configured to enable the clock chopping stage in pulse mode responsive to the mode control input signal being in the first state, enable the clock chopping stage in phase mode responsive to the mode control input signal being in the second state, and disable the clock chopping stage responsive to the clock enable signals being inactive.

18. The microprocessor of claim 17, wherein the AOI logic gate comprises:
  a first stage configured to disable the clock chopping stage responsive to the clock enable signals being inactive; and
  a second stage configured to enable the clock chopping stage in pulse mode responsive to the mode control input signal being in the first state and enable the clock chopping stage in phase mode responsive to the mode control input signal being in the second state.

19. The microprocessor of claim 14, further comprising a clock enable circuit configured to disable the clock generation stage responsive to the clock enable signals being inactive.

20. The microprocessor of claim 14, wherein the mode control input signal is in the first state responsive to the microprocessor being in one of a normal functional operating mode and a launch/capture stage of a scan test mode and the mode control input signal is in the second state responsive to the integrated circuit being in one of a load/unload stage of the scan test mode, a low power mode, and a standby mode.

* * * * *